Oct. 29, 1974  D. E. HARRISON  3,845,183
METHOD OF MAKING A SOFT INTEGRAL-SKIN FOAM SEAT
Filed Aug. 8, 1972  4 Sheets-Sheet 1
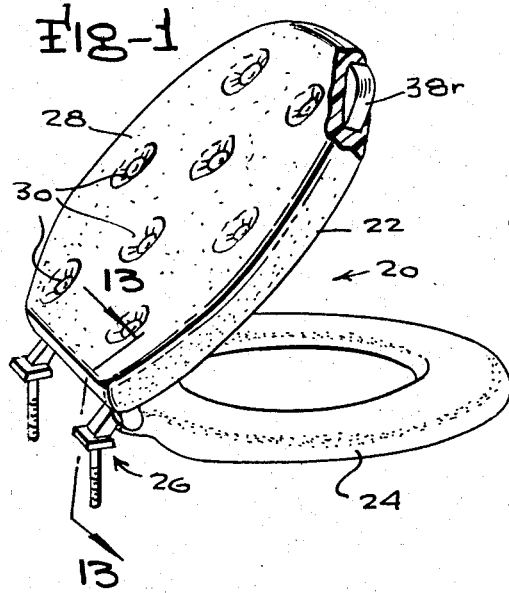
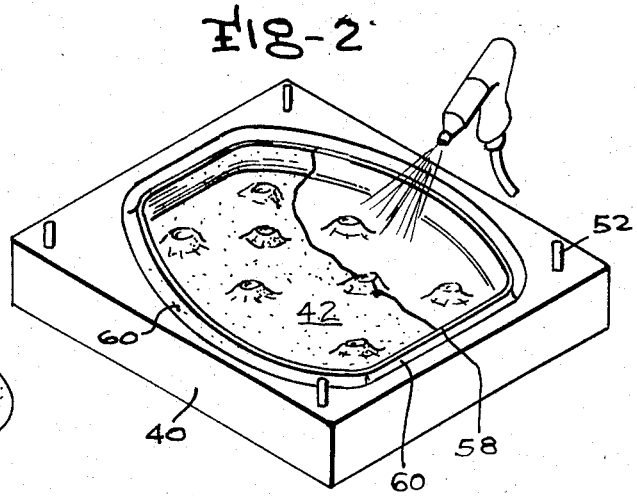
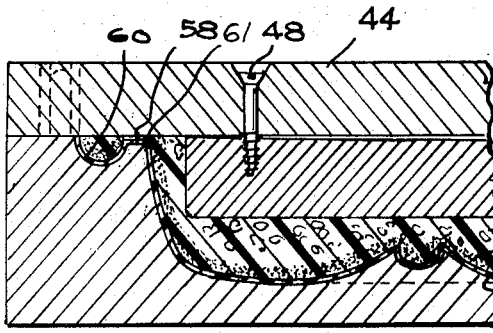
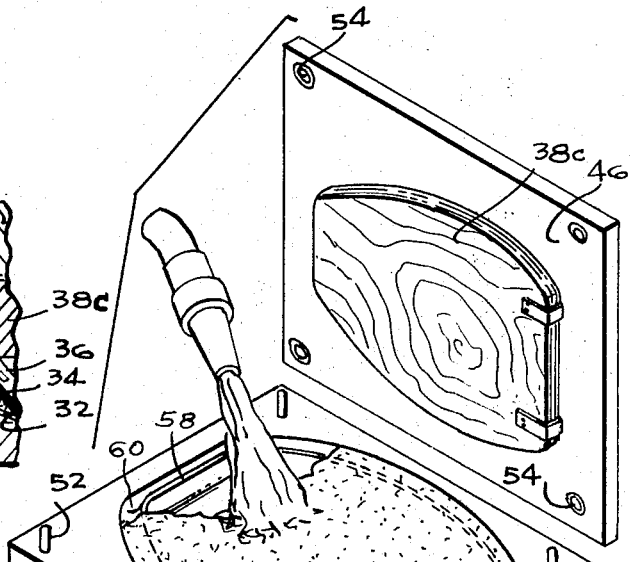
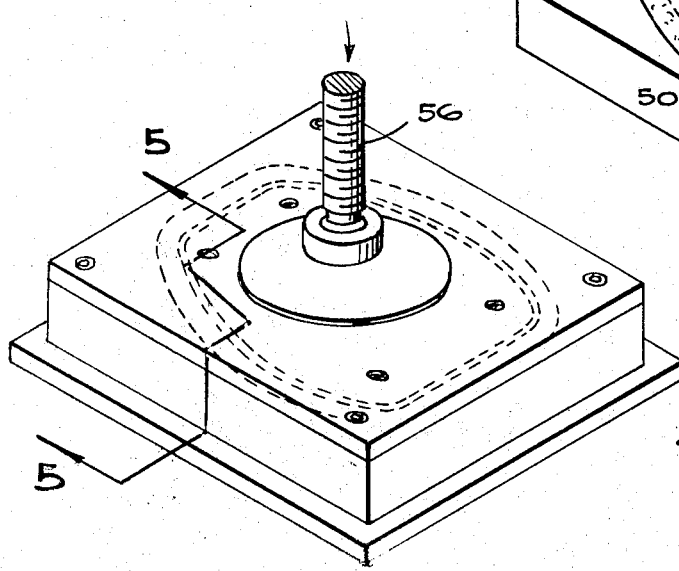

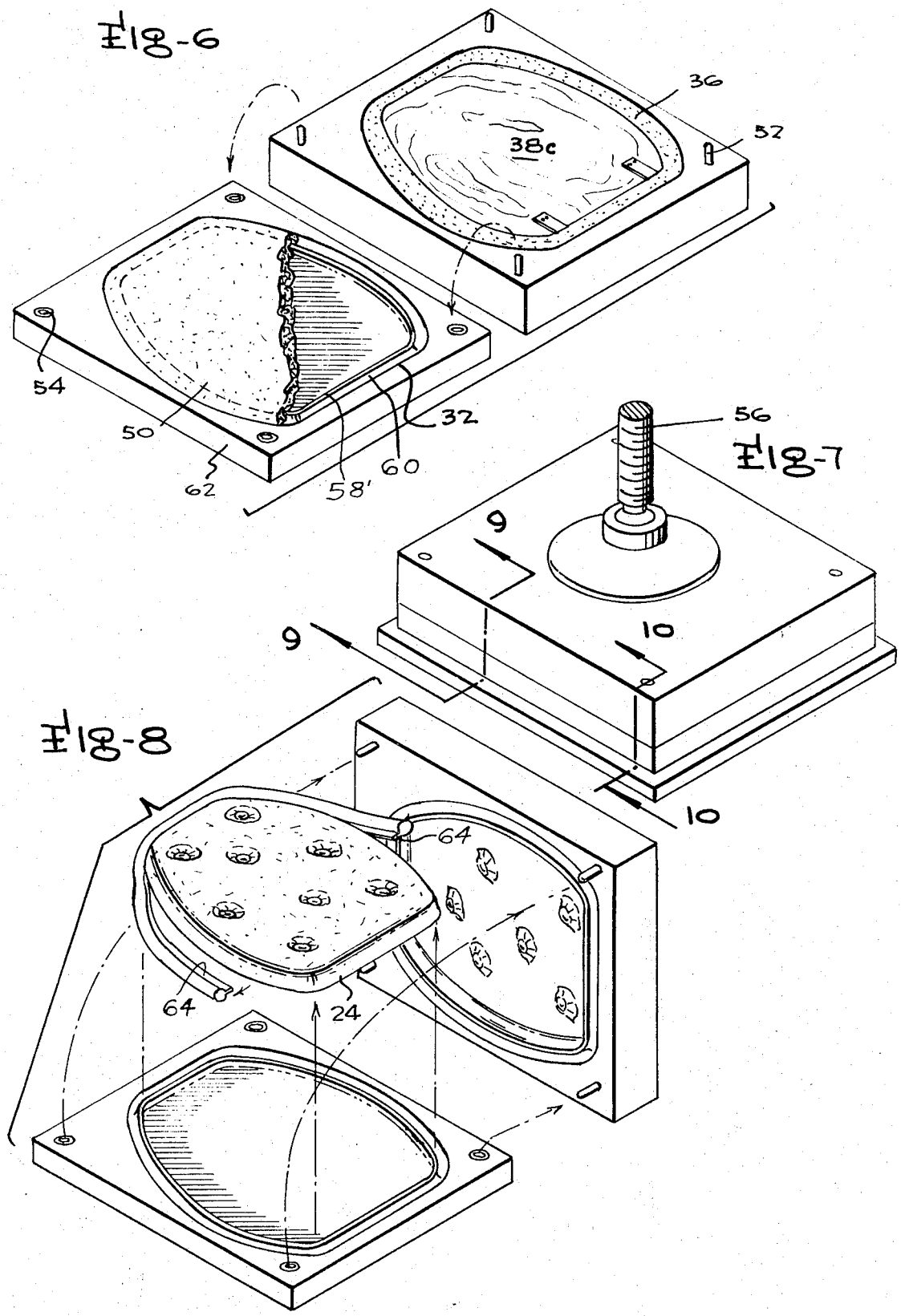

Oct. 29, 1974　　　D. E. HARRISON　　　3,845,183

METHOD OF MAKING A SOFT INTEGRAL-SKIN FOAM SEAT

Filed Aug. 8, 1972　　　　　　　　　　　　4 Sheets-Sheet 3

Oct. 29, 1974  D. E. HARRISON  3,845,183
METHOD OF MAKING A SOFT INTEGRAL-SKIN FOAM SEAT
Filed Aug. 8, 1972  4 Sheets-Sheet 4
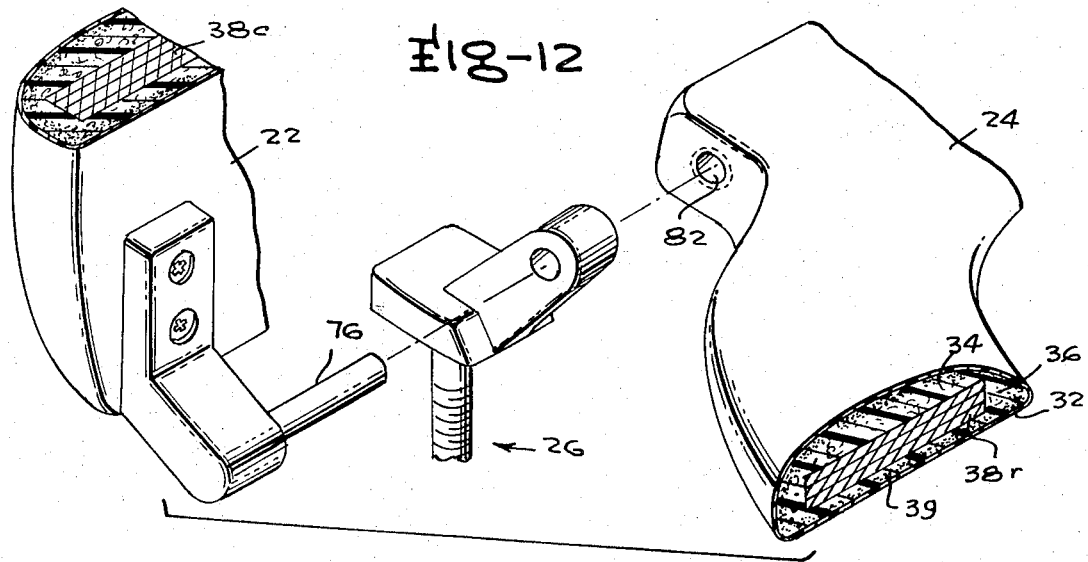
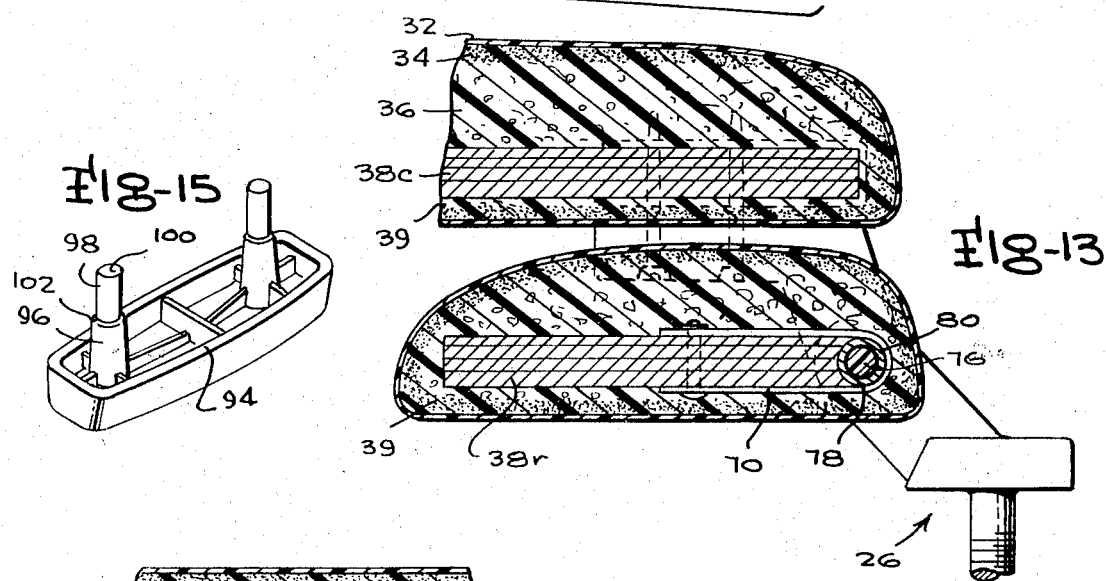
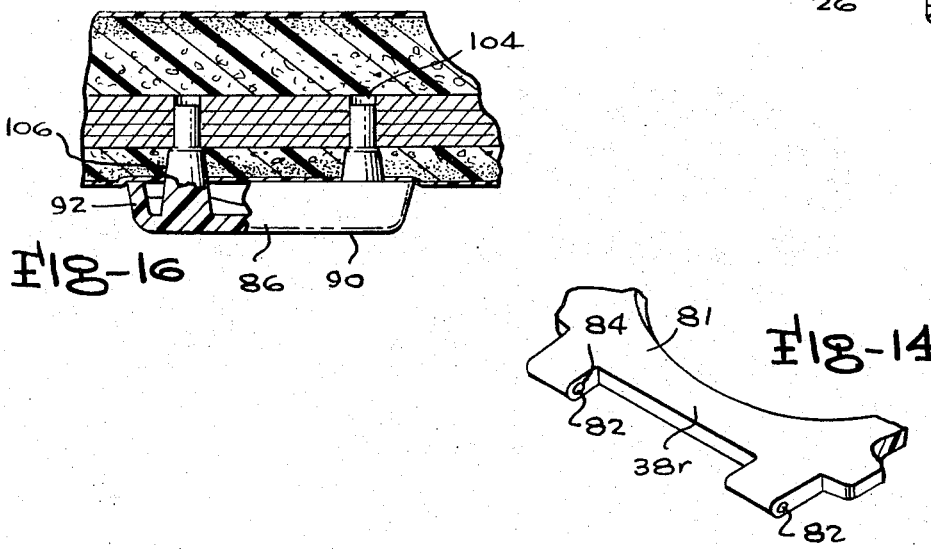

United States Patent Office 3,845,183
Patented Oct. 29, 1974

3,845,183
METHOD OF MAKING A SOFT INTEGRAL-SKIN FOAM SEAT
David E. Harrison, Columbus, Miss., assignor to Beneke Division, Beatrice Foods Co., Columbus, Ohio
Filed Aug. 8, 1972, Ser. No. 278,862
Int. Cl. B29d 27/00
U.S. Cl. 264—46.6                     21 Claims

ABSTRACT OF THE DISCLOSURE

A method for molding a composite soft toilet seat assembly from an expanded foam and a rigid insert which is substantially gas and liquid impervious and which has an integral skin which may be configured or smooth on all sides and does not exhibit unsmoothness produced from foaming gas release. The method utilizes two half molds which are separately open face poured with polyurethane reaction mixture. At least the first half mold is designed to produce an intentional flash around the edges of the molded product in order that upon a second pouring that the flash will act as a barrier or seal to prevent the second pouring of the reaction mixture from contact with the sides of the first pouring.

BACKGROUND OF THE INVENTION

This invention relates to a unique process for the production of a soft seat assembly. More particularly, the present invention relates to a method of making a soft toilet seat assembly from an expanded foam material and rigid insert having an integral skin that is substantially impervious to liquids and gases usually found in the bathroom, as well as being scuff resistant, sturdy and sanitary and which may be provided with any surface configuration desired upon all exterior surfaces.

Cushioned toilet seats are known in the art, and while they do have the comfort feature of providing a resilient surface, all the present models known to be commercially available suffer from one or more undesirable characteristics apparent in either the use of the seat or the method of manufacturing.

One of the typical cushioned toilet seats known in the art is that illustrated in Samuels 3,513,050. While this cushioned toilet seat does remove the rigid, hard feeling undesirable in the conventional toilet seats, the cushioned effect leads to additional problems due to the air holes provided for the intake and exhaust of gases into the toilet seat as a compression force is applied or removed from the seat. These gases are oftentimes odorous and are quite undesirable. Moreover, if these gases contain septic organisms drawn into the seat from the environment, the subsequent use of the toilet seat can project these septic organisms back around the unsuspecting user. The storage and subsequent release of these noxious gases is totally unacceptable for continued safe sanitary usage. It may appear simple to block these external ports for the passage of air but to do so generally has resulted in loss of the desirable resiliency.

Another similar cushioned toilet seat which is presently commercially produced is that shown and described in Samuels 2,771,612. This seat is constructed by vacuum drawing of a vinyl film tightly over a foam top portion and a rigid base and heat sealing the edges. While providing a cushioning effect the integrity of such a construction has been found to be frequently compromised by liquids and gases due to the ease with which the vinyl film may be cracked or pierced. Adding to the lack of sanitary conditions characteristic of such a product is the heat sealed edge which acts as a collector of dirt and septic and odorous liquids.

Other approaches to manufacturing a soft seat assembly have additionally failed to incorporate sufficient strength in the seat to withstand the rigors of normal use or abuse. Seat strength must also include the ability to secure the conventionally used hinges to permit the seat to pivot. To achieve this, a rigid component should be incorporated with foam into the composite article.

It is desirable for efficiency and particularly for attaining the functional characteristics necessary for a safe, sanitary and durable composite article that the foam be produced and molded around the rigid base. With present molding techniques for composite foam articles, such a product would necessarily have at least one unsmooth side produced by the escape of the foaming gases. A toilet seat with such a roughened surface would be unsightly and not acceptable as a commercial product.

Ideally, the final soft toilet seat would have the appearance of an integral composite article that could be used in a safe, sanitary manner and would also include all sides having a selected surface which could be of a fanciful design or a smooth surface.

SUMMARY OF THE INVENTION

The present invention includes a method for molding a composite, soft toilet seat from an expanded foam and a rigid insert having a gas and liquid substantially impervious integral skin which may be configured or smooth on any or all sides of the product and which does not contain any exposed side possessing the unsmoothness produced from the foaming gas release. The method utilizes two half molds in which one half may have a unique design pattern impressed on the surface whereby the molded article produced will contain the identical design or optionally the surface may be smooth. The first step utilizes one of the half molds which is provided with an intentional flash around the edge of the mold to receive a portion of the foam material to be expanded. The half mold is coated on the interior with a continuous film former and thereafter a liquid polyurethane foamable reaction mixture is added while the mold is in open face position. The insert to be used may be positioned in the foamable mixture separately or preferably attached to the under surface of a top surface mold portion, which fits over the top of the first mold half to cover the mold half and the contained reaction mixture. The mixture is then cured in the conventional manner. The top surface mold portion is then removed leaving the insert imbedded in the molded polyurethane foam with the deliberate flashing surrounding the edge. The insert is provided with an integral reinforcing means at one end to receive both the hinge posts and screw fasteners of the hinge assembly.

The process continues by coating the second mold half with the same continuous film former and then adding a liquid polyurethane reaction mixture into the open face of this second mold half. The first mold containing the cured polyurethane foam is inverted and placed over the second mold half to cover the second mold half and the reaction mixture. The insert also optionally may be positioned separately at this time rather than in the first pour. The reaction mixture in the second mold half is thereafter cured while permitting the reaction mixture to rise into contact with the upper first mold having the cured foam and insert but being prevented from bypassing the bottom plane of the first mold half by means of the flashing around the first molded portion.

The demolded toilet seat assembly is soft, abrasion resistant, substantially, continuously impervious to gases and liquid, sanitary, and importantly, has no exposed side made unsmooth by escaping reaction gases. The seat further includes an integral outer skin that may be pigmented and a two phase interior of polyurethane having first, an outer integral high density tough skin polyurethane and second, an inner core of lower density soft polyurethane foam containing substantially open cells and a substantially rigid insert positioned at least partially below the inner core and within the high density tough skin. Thereafter conventional hinge means may be secured to the seat through the use of the reinforcing means incorporated on the insert.

Bumpers are inserted into the bottom surfaces of the seat ring to maintain the surfaces raised from the surface of the toilet for sanitary purposes. These bumpers are of novel shape and inserted at least in part into the rigid insert and form a compressing leak-tight fit with the foam and its integral skin.

It is the object of this invention and this method to produce a composite article having a soft, tough continuous outer skin and a soft polyurethane foam interior surrounded by a tough higher density polyurethane skin and provided with a rigid insert for holding a hinge assembly.

It is also an object of the present invention to provide a soft toilet seat that is substantially gas and liquid impervious and, therefore, does not draw in and hold odorous liquids and gases that may be in the environment during use of the toilet seat.

This invention also has as an object the provision of a method for producing a composite article molded from polyurethane foam which has no exposed visible side exhibiting an unsmooth or otherwise undesirable area of foaming gas release.

Another object of this invention is the provision of a two step method for molding foam which avoids the unevenness of any exposed surface and at the same time prevents the overlapping of one pouring past the edges of a second pouring.

It is also an object of the present invention to provide a simple method for making a molded composite article containing an insert and maintaining the insert in the proper position during the molding procedure.

This invention also has as an object the provision of a method permitting simple open face pouring of two respective mold halves and positioning of an insert in one mold half thereafter curing the foamable reaction mixture and covering the uncured reaction mixture in the second mold half with the cured foam in the first mold half to produce a composite article.

These and other objects will become apparent upon study of the following specification and claims including the drawings:

THE DRAWINGS

FIG. 1 is a perspective view partly broken away of the soft toilet seat and cover with design having a hinge assembly ready for mounting on conventional bowls.

FIG. 2 is a perspective view of a mold half embodying the design of the cover and illustrating the initial release coating and the subsequent film former coating.

FIG. 3 is a perspective view of the mold half of FIG. 2 in which the foamable polyurethane liquid reaction mixture is added and to which a clamp cover containing an insert is ready to be positioned on top of the mold half.

FIG. 4 is a perspective view of the mold half of FIG. 3 with the clamp cover illustrating the pressure means to be applied to maintain the clamp cover in place during the curing of the polyurethane foam.

FIG. 5 is a cross-sectional view taken along lines 5—5 of FIG. 4 partly broken away illustrating the position of the insert into the liquid polyurethane foamable reaction mixture.

FIG. 6 is a perspective view of the mold half of FIGS. 2 and 3 containing the cured polyurethane and the open face poured second mold half having a portion of the polyurethane liquid reaction mixture uncured and partly broken away.

FIG. 7 is a perspective view showing the completion of the superposing of the second mold half on the top of the first mold half of FIGS. 2 and 3 and the means for applying pressure.

FIG. 8 is an exploded perspective view of the demolding and the breaking away of the flash from the completed cover of the toilet seat assembly of the present invention.

FIG. 12 is an exploded perspective view partly broken away illustrating the hinge assembly and the position of the seat ring and cover.

FIG. 13 is a cross-sectional view taken along lines 13—13 of FIG. 1.

FIG. 14 is a perspective view of an alternate embodiment of the insert illustrating the mounting for the hinge post.

FIG. 15 is a perspective view of the bumper for securing to the underside of the seat ring.

FIG. 16 is a cross-sectional view partly broken away illustrating the positioning of the bumper in the seat ring.

DESCRIPTION OF THE PREFERRED EMBODIMENT

The Seat Assembly

Figure 9:
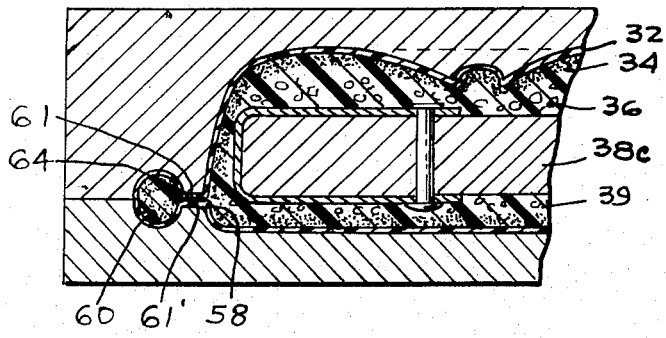
FIG. 9 is a cross-sectional view taken along lines 9—9 of FIG. 7 and partly broken away illustrating the positioning of the insert within the polyurethane foam during the curing of the lower mold half.

The term "seat" or "toilet seat assembly" as used throughout is to be interpreted to include not only the seat ring which may be open or closed in the front or back but also the incorporation of an optional cover unless specific reference is made to the cover or ring.

The toilet seat assembly shown generally at 20 includes a cover 22 and a seat ring 24 hinged together by a suitable conventional hinge assembly 26. The upper surface 28 of the cover 22 may be embossed or otherwise decorated with various designs 30 or may be smooth, if desired. The cover and the seat ring are essentially identical in construction except for shape and surface ornamentation. The following description, therefore, of the cover will identically describe the construction of the seat.

The outer skin 32 is composed of a film former that may be one of many well known chemical coatings. Among such coatings may be included polyurethane, polyvinylchloride, polyvinyl alcohol, polyvinyl butyrate, butyl rubber, and polyvinyl butyral and copolymers of any of the above. The film former comprising this skin 32 is preferably pigmented as desirable with well known pigments in a conventional manner. The vehicle suitable for carrying such pigmented film formers include the conventional solvents. Typical solvents include various aromatic ketones such as methyl methyl ketone, methyl isobutyl ketone, alcohols such as ethyl, butyl, isopropyl and the like, aromatic solvents such as toluene, xylene, or cellosolve. The coating may be in the form of a skin of thickness from between .002 and .009 inches but preferably is in the range of .005 inches. The thickness, however, is not critical and may vary within wide limits.

Positioned within and contiguous to the outer skin of the film former is a core of polyurethane foam having an integral high density soft tough skin at 34 and a soft flexible foam interior 36. The outer skin of film former 32 and the tough skin 34 of high density polyurethane provides a gas and liquid impervious barrier surrounding the flexible foam 36.

For strength and in order to permit the attachment of the hinge means 26, a rigid insert 38 is provided which is surrounded and contiguous with the flexible foam 36.

The soft foam interior may optionally be positioned only upon the upper surface of the seat ring or cover immediately above the insert 38. Optionally below the insert as shown at 39 may be a resilient but non-foamed material.

The insert may be any rigid material capable of withstanding the normal molding temperatures and may, for instance, be composed of wood, metal, fiberglass or premolded plastic material. Simple, inexpensive plywood has been found to be quite suitable and may vary in thickness between 1/4" to 1/2" or more in the event greater strength is desired. The insert generally fills the major dimension of the seat in order to provide as much strength as possible. It has been found that the insert also substantially improves the dimensional stability of the seat not only upon release from the mold but under various climatic conditions.

The insert 38 is preferably reinforced to receive the hinge assembly. The reinforcement may be in the form of a pair of "U"-shaped straps 70 secured to the back end of the insert for both the seat ring 24 and cover 22. The straps secured to the cover insert 38c are designed to receive the conventional screw fasteners 74 securing the hinge assembly 26 to the cover 22.

Figure 11:
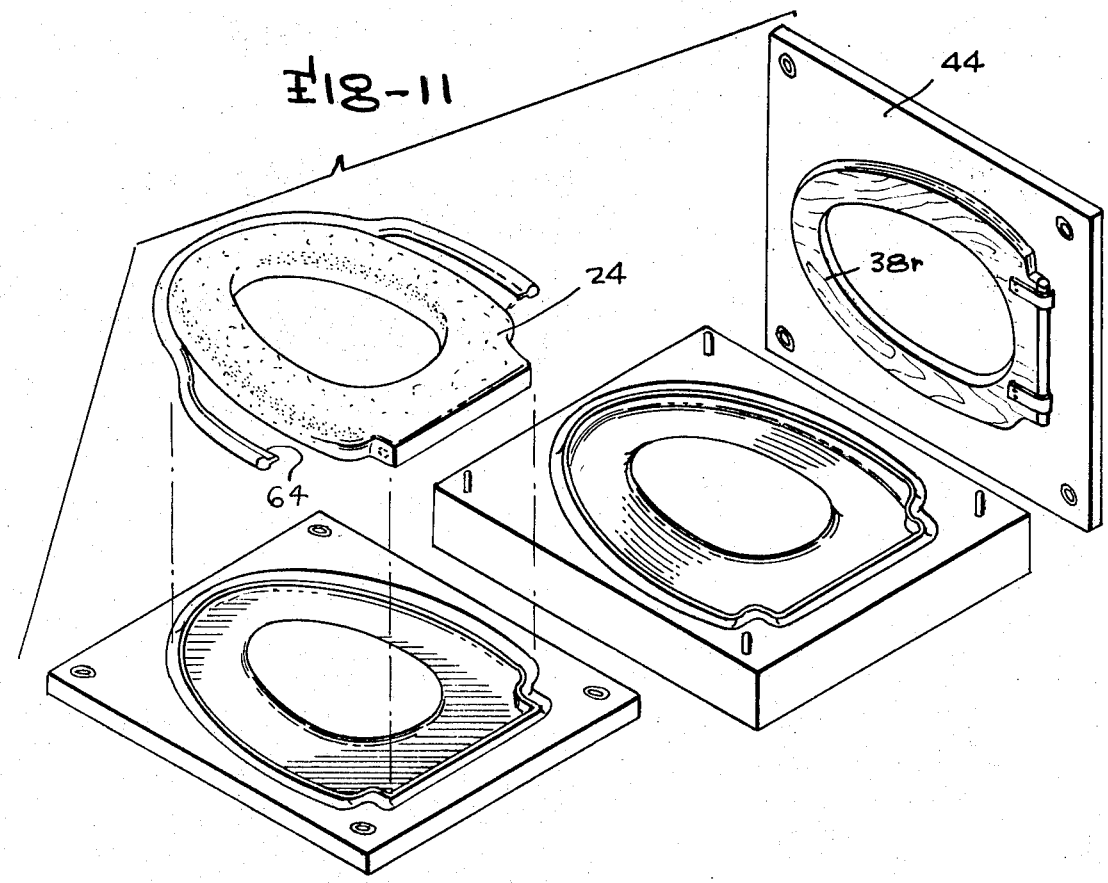
FIG. 11 is an exploded perspective view illustrating the molding and demolding technique for producing the seat similar to the procedure for manufacturing the cover as illustrated in FIG. 8.

The insert 38r for the seat ring is reinforced with the "U"-shaped straps 70 and is designed to support the conventional hinge posts 76 of the hinge assembly 26. To pivotally receive the hinge posts and secure the seat ring to the hinge assembly, a hinge bushing 78 is retained in the bottom of the "U" of the strap 70 and preferably, but not necessarily, extends the distance between the straps as shown in FIG. 11. The hinge bushing may be any tubular member capable of receiving and permitting the pivotal movement of the hinge posts 76 and may be composed of metal, plastic or the like. To assure the proper positioning of the hinge bushing 78 in the straps 70, it is desirable to groove the end of the insert 38r as shown at 80 of FIG. 13.

Optionally as shown in FIG. 14 at 81, the seat ring insert 38r may be shaped or molded of metal or plastic and provided with an integral hinge post receiving bore 82 extending across or partially across the rear for receiving the hinge posts 76. If desired, for added strength, the integral bore 82 may be provided with an internal bushing 84 for longer wear characteristics.

THE MOLDING METHOD

The polyurethane integral tough skin 34 and the interior or core 36 are formed from a conventional liquid polyurethane reaction mixture. The polyurethane foam produced is essentially open cell foam. This liquid polyurethane reaction mixture comprises as a first component, A, a polyisocyanate of the organic type which reacts with a chemical equivalent of a second component, B, a hydrogen containing material and a suitable blowing agent. The ratio of a component A to B is 20–50 A to 80–50 B but is not critical. The amount of blowing agent, trichloromonofluoroethane, (Freon 11) is not critical and may be up as high as 25% by weight of the first and second components. However, usually it is between 5% and 15%—preferably 10%. Various crosslinkers may be used along with known catalysts which do not form a part of this invention.

The reactive hydrogen containing materials are well known to be generally divided within the broad classes of polyester, polyols and polyether polyols and may also include polyester amides. Typical members of these classes include the polymeric materials of the type known as polyester polyols which are prepared by reacting the aliphatic polycarboxylic acids such as oxalic, malonic, succinic, etc. with a polyol such as a glycol. Other polycarboxylic acids include phthalic, terephthalic and isophthalic acid. Other typical polyols useful to form the polyesters include ethylene glycol, propylene glycol, and other high molecular weight polyols. The polyetherpolyols preferably are of a M.W. of 3,000–6,500.

Any suitable organic polyisocyanate well known in the art to produce a polyurethane may be used. Representative of a vast group are the following: hexamethylene diisocyanate, tolylene diisocyanate, and methylene bis-(4-phenyl isocyanate).

Other suitable polyisocyanates, polyols or reactive hydrogen containing material may be found, for instance, in Pat. 3,478,134.

In view of the fact that the polyurethanes formed from aromatic isocyanates are not light stable, they are not particularly well suited as a film former for the outer skin. Accordingly, if polyurethane skin is to be utilized as a film former as is preferred, it may be selected from a well known list of aliphatic diisocyanates in the conventional manner. The interior core of the product is preferably formed from the aromatic isocyanates since the integral more dense tough skin and the pigmented outer skin will protect the interior core from deterioration due to impinging light. A suitable aliphatic isocyanate that may be used is hexamethylene diisocyanate, for example.

The proportions of the ingredients forming the liquid foamable polyurethane mixture may vary considerably as well as the particular blowing agents that are found useful. All of the ingredients and the percentages are conventional for the production of the core of polyurethane foam with integral tough high density skin.

Typical examples of the composition used for the present invention are:

| Film former | Polyurethane reaction mixture |
|---|---|
| Hexamethylene diisocyanate glycerine based propylene oxide adduct (M.W. 3,000). | A, 29%-polymeric diphenyl methane diisocyanate. |
| 10% crosslinker—glycerine or dichlorobenzidene. | B, 51%-glycerine based propylene oxide adduct having about 5,000 M.W. |
| 50% Cellosolve solvent pigmented as desired. | 10% Freon 11 blowing agent (in "A" component); 10% crosslinker-triethonolamine or glycerine (in "B" component). |

The polyol of the film former may be a polyether triol or a mixture of 75% triol and 25% diol or any similar combination. The M.W. is preferably 1,000–4,000. The crosslinker may be present in the amount of 2%–20% of the polyol. The solvent may range from 10%–75%, preferably about 50%. All these materials and proportions for both the film former and the reaction mixture for the core are conventional and well known.

The molding process of the present invention may be more apparent from FIGS. 2 through 11 of the drawings. In the drawings, there are shown the step for the molding of the cover 22 having the surface embossing 30 thereon though it is understood that the surface may be smooth. Such surface designs are embodied in the half mold 40 shown in FIG. 2. The interior surface of the half mold 40 is optionally treated with a release agent at 42 which may be any of the well known release agents such as polyethylenes, waxes, etc. any of which may be used or may be omitted as desired in a manner well known in the art.

The next step is the application of the film former which preferably is pigmented and formed from an aliphatic isocyanate containing polyurethane reaction mixture, however, any one of the well known conventional film formers may be used.

Upon completing the film former coating, the polyurethane liquid reaction mixture is poured into the top of the mold and a clamp cover 44 having an insert 38 is secured over mold. This clamp cover is preferably treated with a non sticking release agent which will not release onto the molded product so as to permit good adhesion between the first and second pours. The insert is removably secured to the underside 46 thereof as by screw 48 to hold the insert in place in the polyurethane foam mixture 50 as shown in FIGS. 3 and 5. Any other means of releasably securing the insert to the clamp cover 44 would be satisfactory. The insert by being held to the clamp cover does not fall to the bottom of the liquid polyurethane mixture which is as yet uncured. Upon placing the clamp cover down onto the top half mold 40 through the use of registry pins 52 to be received in complementary bores 54 and the clamp cover held down with high pressure as shown by press 56 in FIG. 4 the liquid foam mixture will expand, but being unable to dislodge the clamp cover 44, produces a dense tough integral outer portion 34 and a light, much less dense, flexible foam core 36 which surrounds the insert 38. As shown in FIGS. 2 through 5, the mold includes a surrounding flash producing lower surface 58 and a draw pocket 60 which hold the excess spillover from the mold, provides escape of gases created by the foam reaction and forms a deliberate flash 61 surrounding the molded product from the first mold. This deliberate flash 61 is an important aspect of the invention since it provides the barrier or seal between the first and second pouring. The flash must be thick enough to effectively prevent the passage of the liquid from the second pouring. Generally, a flash thickness produced from the first pour of a maximum of about .015" is satisfactory but may vary from .001" to .100". The particular dimension of the flash is not critical provided it is essentially solid or not porous.

After suitable time for curing, the clamp cover may be removed after screw retaining means 48 is removed so as to retain the insert 38 integrally molded into the polyurethane foam.

Alternatively, the insert may be placed in the first mold after the reaction mixture has cured. It is possible, for instance, to provide a cavity upon molding the first pour which will receive the insert. The previously cured first pour and the fitted insert are then utilized as if the insert were integrally molded in the first pour.

Figure 10:
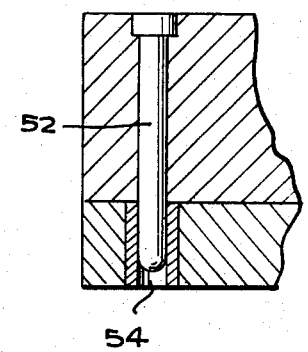
FIG. 10 is a cross-sectional view taken along lines 10—10 of FIG. 7 and illustrating the pin means for registering the positioning of the upper and lower mold halves.

After the top half is molded with the integral or positioned insert, the lower half mold 62 is coated with the same release agent 42, if desired. Thereafter, the film former coating or outer skin 32 is applied following which, as previously described, the liquid polyurethane foamable reaction mixture 50 is open face poured into the second half mold which is provided with the same or similar continuous flash producing surface 58' and draw pocket 60 of similar dimensions. The requirement of the flash producer 58' is principally simply to permit the escape of the reaction gases, if any, but also to form an added flash 61'. Optionally, the blowing agent may be omitted in the second pour. Following the open face pouring of the half mold 62, the previously poured and cured polyurethane with integral or subsequently positioned insert is placed on top of the uncured polyurethane foamable liquid mixture as shown in FIG. 6 with pins 52 registering with bores 54 as best shown in FIG. 10. The interior of the mold is as appears in FIG. 9. Upon pressure being applied by conventional press 56 as shown in FIG. 7 and upon suitable curing, the liquid polyurethane reaction mixture in the bottom portion of the mold as shown in FIG. 9 rises up to expand into contact with the insert 38. The flash 61 previously formed in the first pouring prevents the rising of the polyurethane of the second pouring from bypassing the plane of the flash 61. There are then no leakages of expanding polyurethane onto the side of the first cure. This second pour or mold forms with the previously cured foam an integral composite article having the air and gas impervious outer skin 32 and the high density tough integral skin 34 adjacent the outer skin 32 and the flexible foam portion 36 which surrounds the insert 38. Excess foam is drawn into the draw pockets 60 and forms the flash which may be trimmed from the article on demolding. The flash 61 and 61' combined and referred to at 64 must be thick enough to demold completely and integrally with the seat. The combined thickness should not be porous as could occur if either flash were too thick and the polyurethane foamed in the flash. A porous or foamed flash, either 61 or 61' could destroy the integrity of the seat upon the flash being cut away as shown at FIG. 8 to expose gaseous or liquid passages into the core of seat. Thus, the maximum thickness of the flash 61 or 61' is such that upon being trimmed no fluid communication is possible into the interior of the seat. Generally a total thickness of up to .100" would be acceptable and should not be porous or expose communicating paths upon trimming.

Upon trimming the flash close to the body of the seat, a smooth substantially invisible juncture is created between the cured first and second pouring. Adjacent to the edge of the flash 64 at the side of the seat, the fluid communication into the interior is further prevented by reason of the integral soft, tough skin 34 which is characteristically non-pourous.

As shown in FIG. 11, the same procedure is repeated for the seat ring of the toilet seat assembly utilizing the clamp cover 44. The insert for the seat ring, 38r, is provided with the hinge post bushing 78 as described. The insert, of course, generally conforms to the shape of the seat. The outer skin of the seat portion may or may not have any design features as desired.

The inner core of soft flexible polyurethane foam contains substantially invisible open cells which are partially or completely gas filled and will compress upon force being applied as when the user sits on the seat. The gas does not have to be released from the seat or the cover since the cells and contained gas simply compress. This feature, along with the integral tough skin and the outer skin of the film former, produce the desirable sanitary features.

Another facet of the present invention is the bumpers 84 as shown in FIGS. 15 and 16, used to maintain the seat ring up from the top of the toilet bowl (not shown) for sanitary purposes. These bumpers are provided with a body 86 having at least one prong 88 and preferably two or more prongs as shown. The body 86 is provided with a closed top 90 and connected sides 92 to form an elongated open top bowl having a smooth continuous edge 94. The prongs 88 protrude outwardly well beyond the edge 94 and include a first portion of a major diameter having a tapered or conical side 96 and an outer portion 98 of reduced diameter. The end 100 of the prong may be blunt or painted but preferably is as shown.

Preferably the length of the prong protruded from the edge 94 is evenly divided between the tapered portion 96 and the outer portion 98. The taper preferably is from about 10% to 40% reduction in diameter from the ⅛" to ½" diameter at the point of protrusion of the prong beyond the edge 94 and the intersection 102 with the cylindrically shaped outer portion 98. The prong length may be approximately ¼" to 1" in length with ½" particularly suitable.

In use, the bumper 84 is force fitted into a bore 104 drilled through the bottom of the seat ring and into the insert 38r. The bore 104 is essentially the diameter of the cylindrically shaped outer portion 98. The tapered portion is then forced into and compresses the foam or resilient polyurethane at 106 surrounding the tapered portion. Such a fitting of the bumper assures a leak tight seal to prevent the ingress or egress of noxious or unsanitary fluids.

It can be readily seen that the toilet seat assembly made in accordance with the present invention having a substantially gas and liquid impervious outer skin will not drawn in or eject any noxious or odorous gases or liquid and will maintain the environment safe and sanitary for use. Moreover, since the toilet seat assembly may be made with a smooth surface, no collecting surface for dirt or septic substances is presented. It is also significant that the toilet seat assembly can be made self-extinguishing in order to present no fire hazard.

Other advantages of the present invention is that the seat assembly provides an energy absorbing surface to prevent or protect against injury if one were to sustain a fall on the seat assembly. In this respect, such a seat assembly is quite an advantage in hospitals and with elderly users who are susceptible to falls. Because of the acoustical properties of foam and the light weight, the seat assembly produces little noise even when dropped from its vertical pivotal position.

Additionally, the present method permits a contoured saddle shape effect to be formed into the seat which is not permitted in prior art methods. It is also an advantage of this invention that the seat assemblies will not adhere to each other as do the current commercial products produced with an external vinyl film.

These and many further advantages may become apparent and are within the spirit of the invention as defined in the following claims.

I claim:

1. A method for molding in two mold halves a composite soft seat having a substantially liquid and gas impervious integral skin comprising:
   pouring a liquid polyurethane foamable reaction mixture into a first mold half in open face position to form a foam upon curing,
   positioning an insert into one of said mold halves,
   forming during curing and by molding a continuous solid flash forming a leak tight seal around the edge of said mold and integral with said foam, applying pressure and curring said reaction mixture to form said foam,
   removing said pressure,
   pouring a liquid polyurethane reaction mixture into a second mold half in open face position,
   inverting and placing said first mold half containing said cured polyurethane foam and said continuous flash over the top of said second mold half to cover said second mold half and said reaction mixture contained therein and the rigid insert between said first and second mold halves,
   sealing the edges of said first mold half from the reaction mixture of said second half by said continuous flash around said first mold half,
   curing said reaction mixture under pressure in said second mold half while permitting said reaction mixture to contact the rigid insert and the cured polyurethane foam of said first mold half including the continuous flash thereof, while maintaining the reaction mixture from said second mold half from contact with the sides of the first molded polyurethane foam, whereby to form an integral composite soft seat having an impervious integral skin upon demolding and severing said continuous flash.

2. The method of Claim 1 wherein a film former is applied to each mold piror to the pouring of the reaction mixture, said film former being selected from the group consisting of polyurethane, polyvinyl chloride polyvinyl alcohol, polyvinyl butyrate, polyvinyl butyral, butyl rubber and mixture and copolymers thereof.

3. The method of Claim 1 wherein said continuous molded flash around the side edges of said first molded polyurethane foam prevents passage of the reaction mixture from said second mold into contact with the sides of said first molded foam.

4. The method of Claim 1 including forming a continuous flash around the edges of said first molded foam, which flash is of sufficient thickness to be essentially non-porous and block fluid communication with the interior of said foam.

5. The method of Claim 1 wherein each mold half is provided with a continuous flash channel portion and including the step of aligning complementary flash channel portion and on respective mold halves and expanding said reaction mixture into at least said flash channels and trimming the flash produced to form a predetermined edge upon demolding.

6. The method of Claim 4 including trimming the flash while maintaining a skin substantially non-porous to liquids and gases.

7. The method of Claim 1 including releasable securing said insert to the underside of a top surface mold portion and positioning said insert above the bottom of said liquid reaction mixture and covering said first mold half and thereafter removing and detaching said surface mold portion after curing under pressure from said insert and permitting said insert to remain in said cured foam.

8. The method of Claim 1 wherein a mold release agent is applied to coat the surface of the mold halves
   wherein said insert extends substantially the major dimension of said seat,
   wherein each mold half is provided with a flash channel portion and including the step of aligning complementary flash channel portions on respective mold halves and expanding said reaction mixture into at least said flash channels and trimming the flash produced to form a predetermined non-porous edge upon demolding.

9. The method of Claim 1 including pouring said polyurethane reaction mixture into said second mold to produce a solid, non-cellular flexible polyurethane.

10. The method of Claim 1 including positioning said insert between said cured polyurethane foam and said liquid polyurethane reaction mixture to be cured in said second mold.

11. The method of Claim 1 including molding said foam from said first half mold with a cavity for receiving said insert after curing said foam.

12. The method of Claim 11 including positioning said insert into said formed cavity prior to placing said insert and said foam in first mold half on top of the reaction mixture in said second mold half.

13. The method of Claim 1 including molding said continuous flash from said foamable reaction mixture and removing substantially all gas from said flash to form essentially a solid non-porous flash integral with the foam core of the seat.

14. The method of Claim 7 including pouring said polyurethane reaction mixture into said second mold to produce a solid, non-cellular flexible polyurethane.

15. The method of Claim 7 wherein a film former is applied to each mold prior to the pouring of the reaction mixture, said film former being selected from the group consisting of polyurethane, polyvinyl chloride polyvinyl alcohol, polyvinyl butyrate, polyvinyl butyral, butyl rubber and mixtures and copolymers thereof.

16. The method of Claim 7 including pouring said polyurethane reaction mixture into said second mold to produce a solid, non-cellular flexible polyurethane, wherein a film former is applied to each mold prior to the pouring of the reaction mixture, said film former being selected from the group consisting of polyurethane, polyvinyl chloride polyvinyl alcohol, polyvinyl butyrate, polyvinyl butyral, butyl rubber and mixture and copolymers thereof, and trimming the flash while maintaining a skin substantially non-porous to liquids and gases.

17. The method of Claim 11 including pouring said polyurethane reaction mixture into said second mold to produce a solid, non-cellular flexible polyurethane.

18. The method of Claim 11 wherein a film former is applied to each mold prior to the pouring of the reaction mixture, said film former being selected from the group consisting of polyurethane, polyvinyl chloride polyvinyl alcohol, polyvinyl butyrate, polyvinyl butyral, butyl rubber and mixture and copolymers thereof.

19. The method of Claim 11 including pouring said polyurethane reaction mixture into said second mold to produce a solid, non-cellular flexible polyurethane, wherein a film former is applied to each mold prior to the pouring of the reaction mixture, said film former being selected from the group consisting of polyurethane, polyvinyl chloride polyvinyl alcohol, polyvinyl butyrate, polyvinyl butyral, butyl rubber and mixture and copolymers thereof, and trimming the flash while maintaining a skin substantially non-porous to liquids and gases.

20. The method of Claim 19 wherein each mold half is provided with a continuous flash channel portion and including the step of aligning complementary flash channel portion and on respective mold halves and expanding said reaction mixture into at least said flash channels and trimming the flash produced to form a predetermined edge upon demolding.

21. A method for molding in two mold halves a composite soft seat having a substantially liquid and gas impervious integral skin comprising:

pouring a liquid polyurethane foamable reaction mixture into a first mold half in open face position to form a foam upon curing, forming during curing and by molding a continuous solid flash forming a leak tight seal in contact with and around the edge of said mold and integral with said foam, applying pressure and curing said reaction mixture to form said foam, removing said pressure, pouring a liquid polyurethane reaction mixture into a second mold half in open face position, inverting and placing said first mold half containing said cured polyurethane foam and said continuous flash over the top of said second mold half to cover said second mold half and said reaction mixture contained therein, sealing the edges of said first mold half from the reaction mixture of said second half by said continuous flash around said first mold half, curing said reaction mixture under pressure in said second mold half while permitting said reaction mixture to contact the cured polyurethane foam of said first mold half including the continuous flash thereof, while maintaining the reaction mixture from said second mold half from contact with the sides of the first molded polyurethane foam, whereby to form an integral composite soft seat having impervious integral skin and severing said continuous flash.

References Cited

UNITED STATES PATENTS

| | | | |
|---|---|---|---|
| 2,185,568 | 1/1940 | Ratner | 264—45 X |
| 2,655,710 | 10/1953 | Roensch et al. | 264—253 X |
| 3,187,069 | 6/1965 | Pincas et al. | 264—45 |
| 3,210,782 | 10/1965 | Buist et al. | 264—45 X |
| 3,298,894 | 1/1967 | Barnette | 264—247 X |
| 3,379,800 | 4/1968 | West | 264—45 |
| 3,445,136 | 5/1969 | Hallstedt | 264—45 X |
| 3,493,257 | 2/1970 | Fitzgerald et al. | 264—45 X |
| 3,623,931 | 1/1971 | Van Hosen | 264—45 X |
| 3,795,722 | 3/1974 | Sassaman | 264—45 |

H. S. COCKERAM, Primary Examiner

U.S. Cl. X.R.

4—237, DIG. 8; 260—2.5AZ; 264—46.755, 250, 321, DIG. 14